United States Patent [19]

Sakamoto et al.

[11] Patent Number: 5,367,238

[45] Date of Patent: Nov. 22, 1994

[54] BACKLASH ACCELERATION CONTROL METHOD

[75] Inventors: Keiji Sakamoto, Hachioji; Yasusuke Iwashita, Oshino, both of Japan

[73] Assignee: Fanuc Ltd., Japan

[21] Appl. No.: 934,662

[22] PCT Filed: May 22, 1992

[86] PCT No.: PCT/JP92/00666

§ 371 Date: Jan. 21, 1993

§ 102(e) Date: Jan. 21, 1993

[87] PCT Pub. No.: WO92/21075

PCT Pub. Date: Nov. 26, 1992

[30] Foreign Application Priority Data

May 24, 1991 [JP] Japan ......................... 149614

[51] Int. Cl.$^5$ .............................................. G05B 19/407
[52] U.S. Cl. ................................................. 318/630
[58] Field of Search ............... 318/560, 561, 569, 570, 318/571, 572, 600, 630

[56] References Cited

U.S. PATENT DOCUMENTS 5,015,935  5/1991  Iwashita .................... 318/630
5,157,597 10/1992  Iwashita .................... 318/561 X
5,204,602  4/1993  Iwashita .................... 318/630

FOREIGN PATENT DOCUMENTS

63-75907   4/1988  Japan .
63-308613 12/1988  Japan .
2-143605  12/1990  Japan .
2-309402  12/1990  Japan .
3-084603   4/1991  Japan .
3-110603   5/1991  Japan .

Primary Examiner—Bentsu Ro
Attorney, Agent, or Firm—Staas & Halsey

[57] ABSTRACT

A backlash acceleration control method capable of more accurately setting a timing for an initiation for a backlash acceleration correction in a servo system that carries out a feedforward control compared with conventional methods. According to this method, the backlash acceleration correction is initiated at the time when the feedforward amount is reversed from positive to negative or vice versa. Furthermore, this initiation time for the backlash acceleration correction can also be determined according to the point of change of the sign of a speed command modified by the feed forward amount. When the feedforward coefficient becomes close to "1", the positional deviation becomes almost "0", and therefore an actual shift movement comes to follow the shift command without time lag. Accordingly, a point where a shift direction of the shift command is reversed will be dispersed, and so an initiation time for the backlash acceleration correction cannot be determined accurately. However, a point (Ts), where a sign of the feedforward amount is reversed, can accurately represent the turning point of the shift direction.

6 Claims, 6 Drawing Sheets

BACKLASH ACCELERATION CONTROL METHOD

TECHNICAL FIELD

The present invention relates to a servo control method for controlling a servo-motor, which actuates a feed rod of a table and the like constituting a machine tool, and more particularly to a backlash acceleration correction applied when a shifting direction of the feed rod is reversed.

BACKGROUND ART

In machine tools, when an actuating direction of a servo-motor for actuating the table and the like is reversed, it is usual that a driven part of the machine cannot promptly response to or follow the reversing movement of the servo-motor because of backlash of feed screw or the effect of friction. For this reason, when a machine tool is performing profile machining, a protrusion may be formed on a cut surface of the workpiece when a shifting direction of a feed rod equipped in the machine tool is reversed.

For example, it is supposed that the machine tool operates to cut the workpiece in an arc shape on a plane defined by two axes of X-axis and Y-axis. And then, the table moves from one quadrant to another quadrant when the table is driven to move toward the plus in the direction of the X-axis and toward the minus in the direction of Y-axis. In this instance, if the table is actuated to move continuously in the same direction with respect to the Y-axis and, to the contrary, actuated to turn toward the minus in the direction of the X-axis, it is expected that no problem will occur with respect to the Y-axis because the cutting operation is continuously and smoothly carried out at the same speed in the direction of the Y-axis. However, the positional deviation in the direction of the X-axis becomes "0" and therefore, first of all, its torque command value becomes smaller, so that the servo-motor cannot reverse its turning direction immediately due to friction, and also, the shifting direction of the table cannot be immediately reversed due to backlash of a feed screw provided for feeding the table. Thus, the shifting movement of the workpiece in the X-direction cannot follow the shifting command and, therefore, there is caused a delay in the response of the workpiece. As a result of such a delay, a protrusion will be formed on the arc-shaped cut surface.

In order to eliminate or reduce this kind of protrusion, so-called backlash acceleration has been employed in such a manner that, when a shifting direction is reversed, a positional backlash correction is applied to a positional deviation and further, when the positional deviation is reversed, the servo-motor is accelerated in its reversing direction by adding an adequate amount of correction (i.e. an acceleration amount) to the speed command in order to reduce the protrusion in the transition phase from one quadrature to another quadrature, as disclosed, for example, in the Unexamined Japanese Patent Application JP, A, 4- 8451.

Furthermore, to reduce the amount of the positional deviation in a servo motor system for controlling a machine tool, a feedforward control is employed. Especially, in the case where a machine tool operates to cut a workpiece in a high-speed operating mode, a time lag in the servo system will cause an error in finished cut shape of the workpiece.

In order to reduce such a shape error, as disclosed in the Japanese Patent Application Serial No. 2-301154, filed by the same applicant of the present application, there has been developed a feedforward control wherein a feedforward amount is obtained by smoothing a shift command supplied from a numerical control apparatus, and thus obtained feedforward amount is added to a speed command that is calculated as an output of a position loop by multiplying a positional deviation by a position gain, thereby executing a speed loop processing on the basis of this corrected speed command.

This feedforward control will be explained with reference to FIG. 4. DDA (Digital Differential Analyzer) 10 splits a shift command Mcmd supplied from a CNC (Computer-equipped Numerical Controller) at a regular interval of a distribution period into shift commands corresponding to position and speed loop processing periods. An error counter 11 obtains a positional deviation by adding the values subtracting a feedback amount Pfb from the speed command outputted from the DDA 10.

A speed command term 12 obtains a speed command, multiplying the positional deviation stored in the error counter 11 by a position gain Kp. A reference numeral 13 denotes a speed loop term, and a reference numeral 14 denotes an integration term that integrates the servo-motor speed so as to detect a position.

Furthermore, an advance-factor term 15 is used in a feedforward control. This advance-factor term 15 serves to advance the shift command outputted from the DDA 10 by an amount corresponding to d period of the position and speed loop processing period.

A smoothing circuit 16 executes a processing for obtaining an average value. A reference numeral 17 denotes a feedforward amount term for multiplying the value outputted from the smoothing circuit 16 by a feedforward coefficient $\alpha$ to obtain a feedforward amount.

Then, thus obtained feedforward amount is added to the speed command, which is obtained by multiplying the positional deviation by the position gain Kp. Thus, a corrected speed command Vcmd is obtained as a control value corrected by the feedforward amount. Then, the speed loop 13 carries out its processing on the basis of thus corrected speed command Vcmd.

In the case where the servo-motor is controlled in such a servo system, if the feedforward coefficient $\alpha$ is close to "1", most of the speed commands Vcmd will be determined by the command produced by the feedforward control. In other words, the positional deviation becomes nearly equal to "0".

Furthermore, as the command produced by the feedforward control has advanced phase, the phase of the positional deviation is delayed relative to the feedforward command.

Moreover, when the feedforward coefficient $\alpha$ is close to "1", the motor will hardly delay in its shift position with respect to the shift command. Consequently, the positional deviation being nearly equal to "0", and the phase being delayed, it will be difficult to determine the point for initiating a backlash acceleration correction at the time of reversal of shifting direction on the basis of the positional deviation.

Figure 5A:
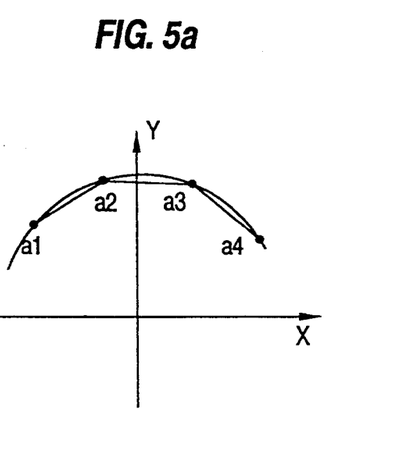
FIGS. 5a and 5b are explanatory views showing the dispersion of point where the shifting direction is reversed.
Figure 5B:
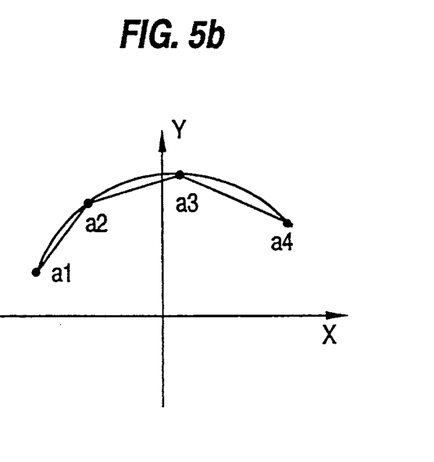

Still further, as an actual position of the motor is not delayed against the shift command, if the distribution period of the CNC is too long (normally, the distribution period is longer than the position and speed loop processing period), the initiating time of the backlash acceleration correction may disperse depending on the starting point of machining program (point a1 indicated in FIGS. 5a and 5b, for example).

FIGS. 5a and 5b show examples of an arc-shape cutting operation. When the positions according to the respective shift commands in each distribution period are given as a1, a2, a3 and a4 respectively, as illustrated in FIG. 5a, in performing the arc-shape cutting operation, the actual reversal of the direction of shift with respect to Y-axis can occur either at position a2, which is a position before the right position for reversal, or position a3, which is a position after the right position for reversal as illustrated in FIG. 5b, depending on the condition of the shift command in each distribution period.

When the feedforward coefficient $\alpha$ is nearly equal to "0", and thus the effect of the feedforward component on the speed command Vcmd is relatively small, the positional deviation causes a delay of several 10 msec (i.e. a value corresponding to 1/Kp). Hence, above-described dispersion can be absorbed by this delay, causing no problem.

However, when the feedforward coefficient $\alpha$ is close to [1], the delay of actual position is almost nonexistent in relation to the shift command. Thus, an error may be enlarged if the backlash acceleration correction is initiated at the above-explained reversing point of position deviation.

DISCLOSURE OF INVENTION

An object of the present invention is to realize a backlash acceleration correction which is capable of initiating a backlash acceleration at an optimum position where the shifting direction is really changed, even in the case where the feedforward coefficient is nearly equal to "1", thereby improving working accuracy.

In order to solve above-problem, the present invention provides a backlash acceleration control method comprising steps of: obtaining a feedforward amount through a smoothing processing in which a shift command of a position and speed loop processing period and another shift commands respectively corresponding to several periods arrayed before and after the position and speed loop processing period are averaged; executing a feedforward control on the basis of said feedforward amount; and initiating a backlash acceleration correction at a time when said feedforward amount is reversed from positive to negative or vice versa, or at a time when a speed command is reversed from positive to negative or vice versa, where said speed command is obtained in such a manner that a positional deviation is multiplied by a position gain, and this multiplied result is then added to said feedforward amount.

When a value of the feedforward coefficient $\alpha$ approaches "1", the positional deviation becomes nearly equal to "0", and the speed command Vcmd modified by the feedforward amount will become substantially the same as the component obtained by the feedforward control, so that an accurate backlash acceleration correction can be executed as far as an initiating time for the backlash acceleration correction coincides with a point where the sign of the feedforward amount is reversed.

Also, the initiating time of backlash acceleration correction may be the point of time where the sign of the speed command Vcmd modified by the feedforward amount is reversed.

BEST MODE FOR CARRYING OUT THE INVENTION

Figure 4:
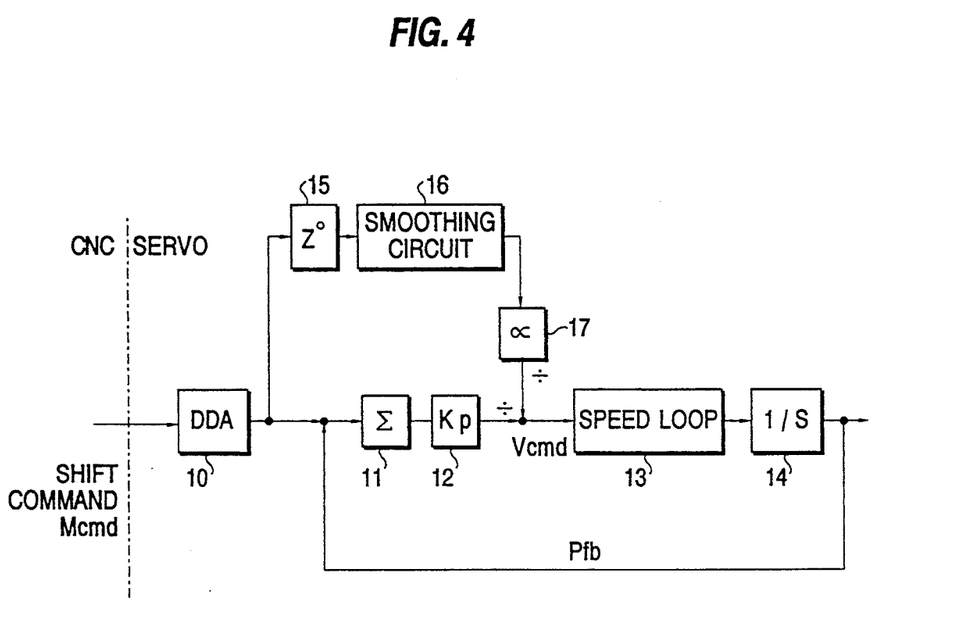
FIG. 4 is a block diagram showing a servo system performing the feedforward control.

In the feedforward control of the servo system as is shown in FIG. 4, where the advance-factor term 15, the smoothing processing circuit 16 and the feedforward coefficient $\alpha$ term 17 are given, its feedforward amount FFO can be obtained from the following equation (1).

$$FFO = \alpha \cdot Z^d (1 + Z^{-1} + Z^{-2} + \cdots + Z^{-(N-1)}) \cdot (DDA\ data)/N \qquad (1)$$

Where N = (distribution period/position and speed loop processing period), and DDA data is a shift command in a position and speed loop processing period.

For example, when the feedforward coefficient $\alpha$ equals to "1"; the distribution period is 8 msec; and the position and speed loop period is 1 msec., as an advanced amount by the advance-factor term 15 is set to approximately half of the distribution period, the d of advance-factor 15 is 4 or 3. For instance, if the d is set to 3, the equation (1) can be rewritten into the following equation (2).

$$FFO = (Z^3 + Z^2 + Z^1 + 1 + Z^{-1} + Z^{-2} + Z^{-3} + Z^{-4}) \cdot (DDA\ data)/8 \qquad (2)$$

That is, the feedforward amount FFO is defined as a value to be obtained by first averaging N pieces of shift command (DDA data) arrayed evenly before and after the shift command (DDA data) of the present position and speed loop processing period, and then multiplying thus obtained average value by the coefficient $\alpha$.

Figure 6:
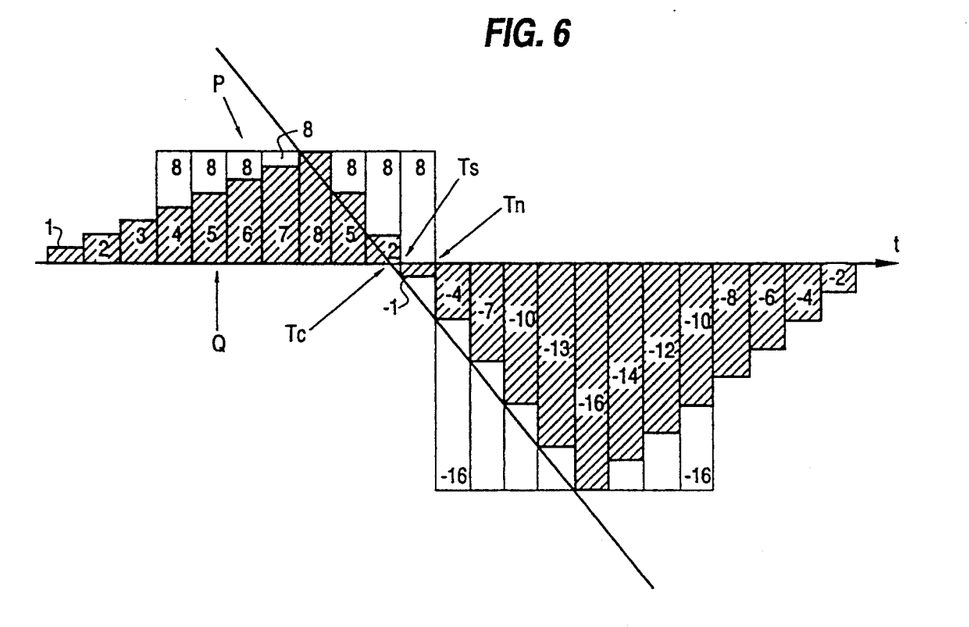
FIG. 6 is an explanatory view showing the relationship between the shift command and the feedforward amount.

If it is supposed that a shift command of [8×8] is outputted from the CNC in the first distribution period, and then a shift command of [−16×8] is outputted in the second distribution period, a shift command in each position and speed loop processing period is obtained as [8] in the first distribution period and obtained as [−16]

in the next distribution period as indicated by P in FIG. 6.

On the other hand, the feedforward amount FFO obtained by the equation (2) is represented by a shaded part designated by Q in FIG. 6. As shown in FIG. 6, a negative or positive sign of the shift command of the distribution period is reversed at a time Tn while a positive or negative sign of the feedforward amount FFO is reversed at a time Ts. Furthermore, if considered as a continuous system, a sign reversing time, i.e. a direction reversing time, is defined as Tc.

The sign reversing time Ts of the feedforward amount FFO is rather closer to the sign reversing time Tc of the continuous system than the sign reversing time Tn of the shift command of distribution period, thereby more accurately indicating the reversing time of the shift direction.

Figure 7:
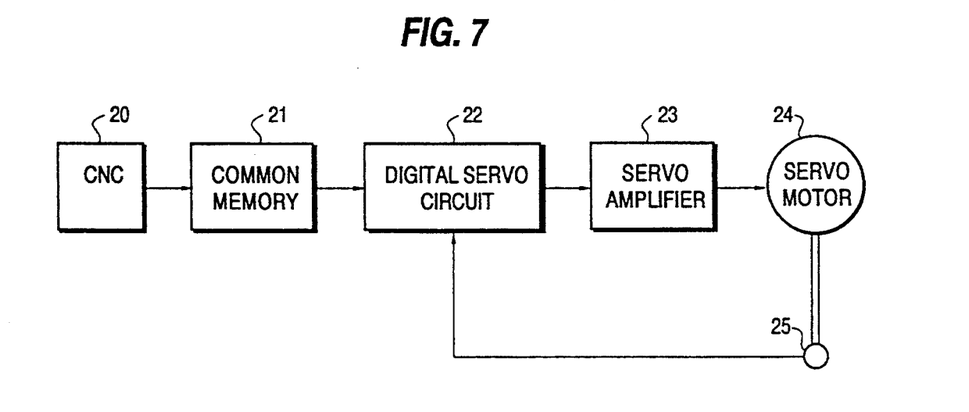
FIG. 7 is a block diagram showing the digital servo system for executing the embodiment of the present invention; and, FIG. 8 is an explanatory view showing dispersion of point where the shift direction is reversed in an example for cutting an arc shape.

FIG. 7 is a block diagram showing an essential part of a servo-motor control system applied to a machine tool, which embodies an example in accordance with the present invention. In FIG. 7, a CNC 20 controls a machine tool, and a common memory 21 receives various commands supplied from the CNC 20 for use in the servo-motor and transmits them to a processor in the digital servo circuit 22.

The digital servo circuit 22 is constituted by the processor, ROM and RAM. The processor executes controls such as a position control, a speed control, and a current control. A servo amplifier 23 is constituted of components such as transistor inverters. A servo-motor 24 actuates a feed rod of the machine tool. A pulse coder 25, as a position detector, detects a rotational position of the servo-motor 24 and feeds the result back to the digital servo circuit 22. By the way, FIG. 7 shows only a servo-motor and a servo amplifier for a single feed rod.

Figure 1:
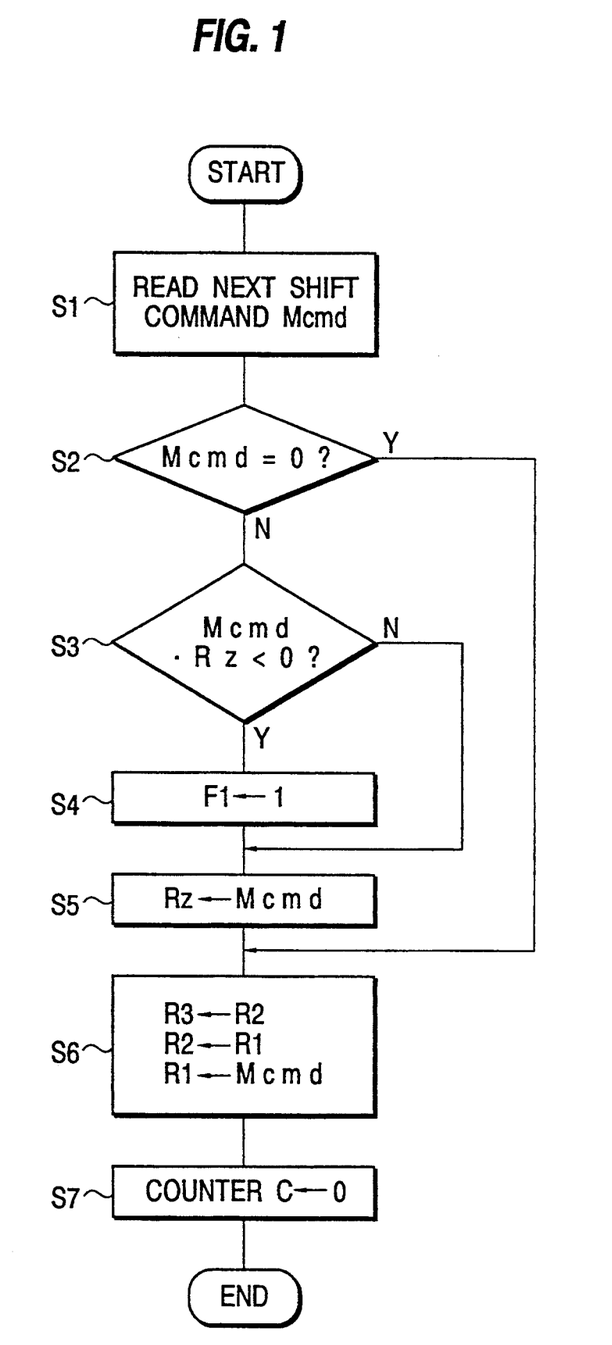
FIG. 1 is a flow chart showing a processing executed by the processor of the digital servo circuit in each distribution period in order to carry out a feedforward and a backlash acceleration correction in accordance with one embodiment of the present invention.
Figure 2:
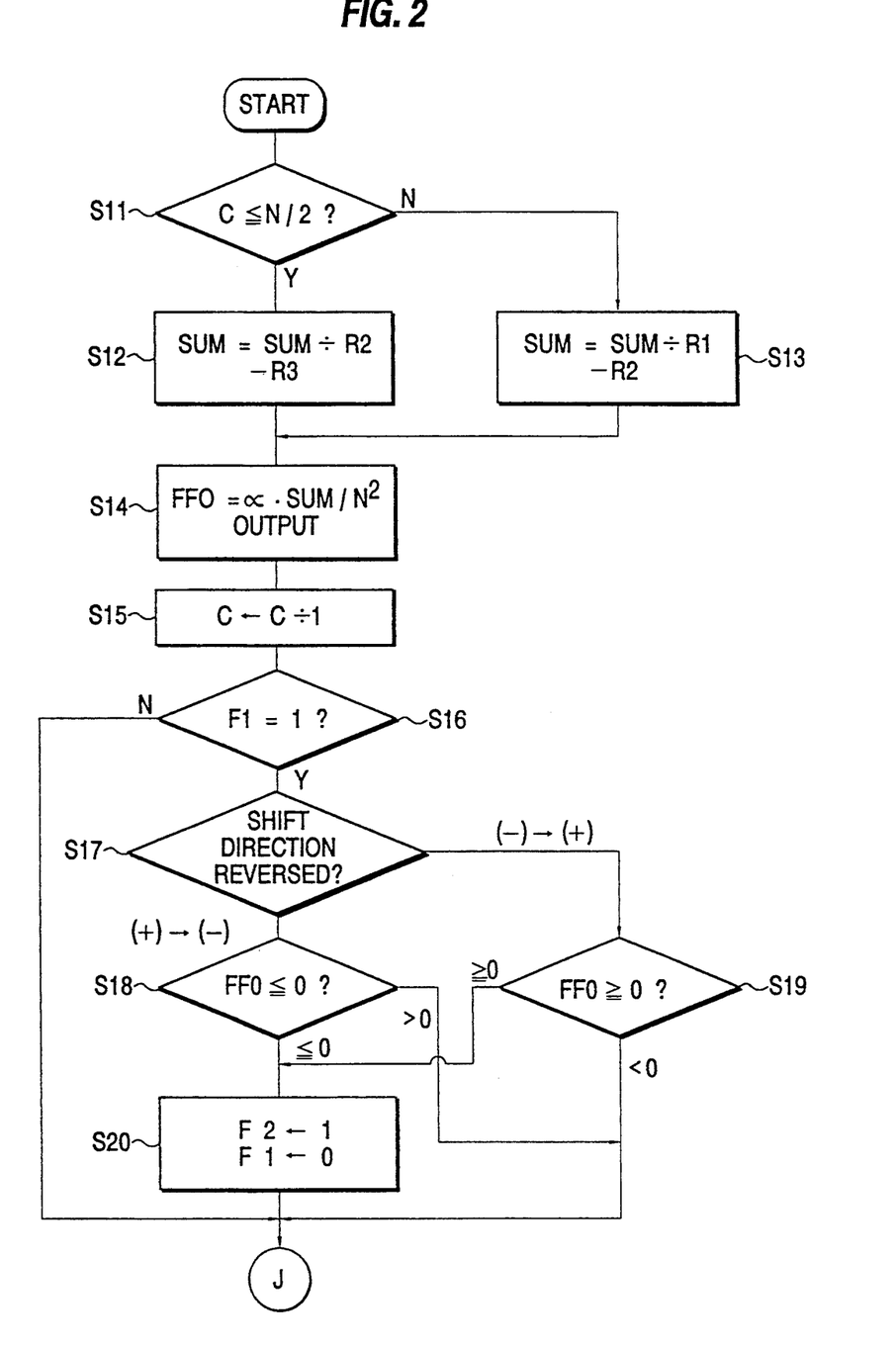
FIG. 2 is a flow chart showing the part of feedforward and the backlash acceleration correction processing to be respectively executed in each position and speed loop processing period by the processor in the digital servo circuit.
Figure 3:
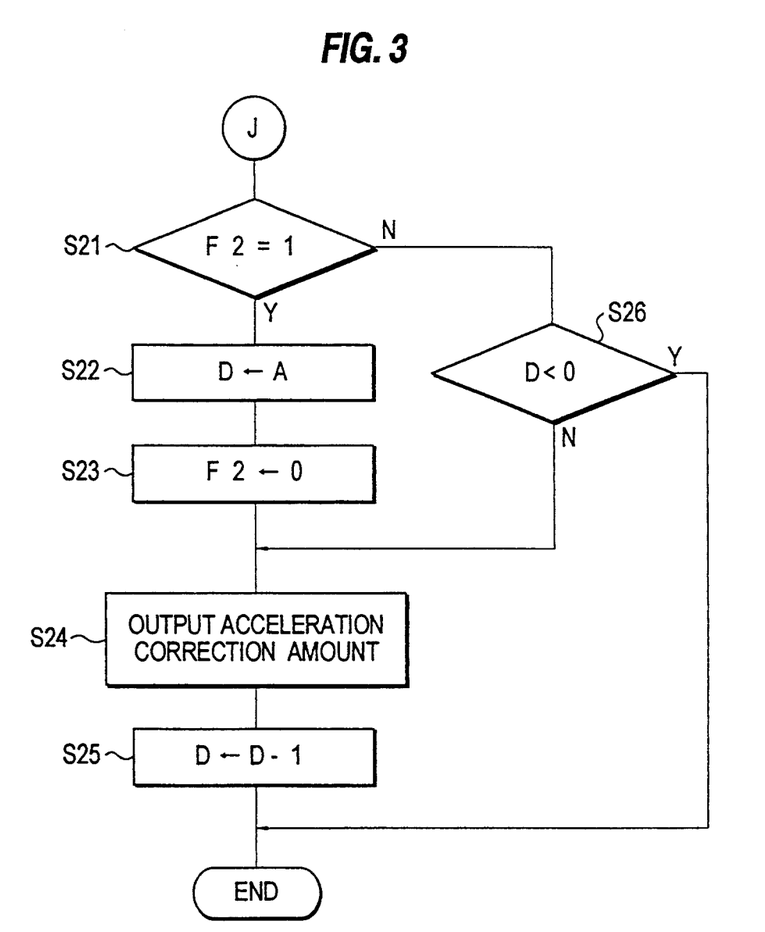
FIG. 3 is a flow chart showing the remainder of FIG. 2.

FIGS. 1, 2 and 3 are flow charts showing a feedforward processing to be executed by the CPU of the digital servo circuit 22. FIG. 1 shows a processing carried out in each distribution period. FIGS. 2 and 3 show a feedforward processing and a backlash acceleration correction processing to be carried out respectively in each position and speed loop processing period. By the way, the remainders of this control other than the feedforward processing are the same as the previous ones and therefore omitted here.

The CPU of the digital servo circuit 22 executes the processing defined in FIG. 1 in every distribution period. First, in step S1, the CPU reads in a next shift command Mcmd (a shift command to be supplied following the shift command for the present position and speed loop processing) from the common memory 21, and judges whether or not the shift command Mcmd read in the step S1 is "0". If "0", the CPU proceeds to step S6. If not "0", the CPU proceeds to step S3, wherein this shift command Mcmd is multiplied by a shift command, which has been read in immediately preceding period and stored in a register Rz, and, judges whether or not thus multiplied value is negative.

That is, it is judged whether or not a positive or negative sign of the shift command read in this period is reversed against a sign of the shift command, which has been read in immediately preceding period. By the way, the register Rz is initially set to "0".

If the result in the step S3 is negative, the CPU proceeds to a step S4, and a flag F1 is set to "1" in order to show that the sign of the next the shift command will be reversed in this step.

Then, in step S5, the shift command read in this period is stored in the register Rz.

Furthermore, if the result in the step S3 is not negative (with the shift command not reversed), the CPU proceeds to the step S5 without setting the flag F1 to "1".

Next, in step S6, a register R3 is updated by a value stored in a register R2; the register R2 is updated by a value stored in a register R1; and the register R1 is updated by the shift command Mcmd read in the step S1 in this period.

As will be described later, the position and speed loop processing carries out the DDA processing on the basis of the shift command Mcmd stored in the register R2 to obtain a shift command for each position and speed loop processing so that each position and speed loop processing can be executed based on this shift command.

With processing defined in the step S6, the register R1 stores the shift command Mcmd for the next distribution period; the register R2 stores the present shift command Mcmd for the present distribution period by which the position and speed loop processing is executed; and the register R3 stores the shift command Mcmd used in immediately preceding distribution period.

Moreover, these registers R1-R3 are all initialized to "0" in the beginning of this processing.

Finally, the counter C is set to "0" in step S7 before finishing one complete processing of the distribution period.

Subsequently, the CPU of the digital servo circuit executes above-described processing in each distribution period. Therefore, the flag F1 is set to "1" when the sign of the shift command Mcmd is reversed.

On the other hand, the CPU in the digital servo circuit executes the processing of FIGS. 2 and 3 in each position and speed loop processing period. First, in step S11, (the CPU) judges whether or not the value of counter C is equal to or less than $\frac{1}{2}$ of the above-described value N which is to be obtained by dividing the distribution period by the position and speed loop processing period (i.e., N=distribution period/position and speed loop processing period). If the value of the counter C is equal to or less than N/2, an accumulator SUM is modified in step S12 by adding to it the value obtained by subtracting the value of the register R3 from the value of the register R2.

On the other hand, if the value of the counter C is larger than N/2, however, the accumulator SUM is modified in step S13 by adding the value obtained by subtracting the value of the register R2 from the value of the register R1, and the CPU proceeds to a step S14. By the way, the accumulator SUM is initially set to "0".

In the step S14, the value of accumulator SUN is divided by square N, and this divided value is next multiplied by the feedforward coefficient $\alpha$ to obtain a feedforward amount FFO.

Then, though it is not shown in FIG. 2, a shift command corresponding to the position and speed loop processing period is obtained by executing the DDA processing on the basis of the shift command Mcmd, which is applied for this distribution period and stored in the register R2, and a speed command is next obtained, on the basis of thus obtained shift command, for carrying out the position loop processing.

Subsequently, thus obtained speed command is added to the above-described feedforward amount FFO to obtain a speed command Vcmd modified by the feedforward amount FFO, and, on the basis of this speed command Vcmd, the speed loop processing will be executed in the same manner as the conventional system.

Next, the counter C is incremented by "1" in step S15. The explanations of the DDA processing, the position loop processing and the speed loop processing are omitted here as these processings are the same as those of the conventional system.

The processing defined by the above-described steps S11–S15 corresponds to a processing for obtaining the feedforward amount FFO. This processing is designed for obtaining feedforward amount FFO on the basis of the shift command Mcmd inputted to the DDA in each distribution period without using the previously described equation (1); however, the result of these two processings are substantially the same, the reason for which will be explained hereinafter.

For simplicity, the following explanation will be made based on the previously described example. That is, the explanation will be made assuming that the distribution period is 8 msec; the position and speed loop processing period is 1 msec; the feedforward coefficient $\alpha$ is "1"; and the shift command Mcmd outputted from the CNC in each distribution period registers one of the values of "0", "0", "8×8", and "−16×8", successively.

When the shift command Mcmd read in the step S1 is "8×8", both the registers R3 and R2 store "0", and the register R1 stores "8×8".

Further, if the value of counter C is equal to or less than N/2=4, the accumulator SUM is added with the difference of the value of the register R2 and the value of the register R3 (assuming that the accumulator SUM has been set to "0" in the initialization step).

In this case, since the values of registers R2 and R3 are both "0", the value of the accumulator SUM becomes "0", and the feedforward amount FFO also becomes "0". Accordingly, as far as the value of the counter C registers any one of 0, 1, 2, 3 and 4, the feedforward amount FFO becomes "0".

However, the CPU goes to the step S13 from the step S11 when the value of counter C becomes "5". Then, the accumulator SUM is added with the value equal to the value of the register R1 minus the value of the register R2. As the register R1 stores a value of "8×8"; the register R2, a value of "0"; and the accumulator SUM, a value of "8×8". Hence, the feedforward amount FFO obtained in the step S14 becomes "1". (Refer to FIG. 6)

Subsequently, the counter C continues to increment. The feedforward amount FFO will become "2" when the value of counter C is "6", and it will become "3" when the value of counter C is "7". Then, if the value of counter C becomes "8" in the step S15, one complete distribution period will be finished, and therefore the counter C will be reset to "0" again in the step S7.

Further, in this case, a next shift command Mcmd having a value of "−16×8" is read in the step S1, while the register R3 stores "0" and the register R2 stores "8×8"; and further the register R1 stores "−16×8".

Furthermore, the accumulator SUM is updated by adding the value "8×8" in the register R2 until the value of counter C becomes "4" (since the value in the register R3 is "0").

When the counter C registers 0, 1, 2, 3 and 4, the feedforward amount FFO will become 4, 5, 6, 7 and 8, respectively.

Moreover, the accumulator SUM stores a value of "8×8"×8 when the counter C registers 4. Therefore, when the counter C becomes "5", and the CPU proceeds from the step S11 to the step S13, the accumulator SUM will be updated in such a manner that the value "−16×8" stored in the register R1 is added to "8×8"×8, and then subtracted by "8×8" stored in the register R2. As a result, the feedforward amount FFO is obtained in the step S14 can be expressed as $$FFO=(8\times8\times8-16\times8-8\times8)/8\times8=5$$

In the same way, the feedforward amount FFO becomes 2 when the counter C registers 6, and becomes −1 when the counter C registers 7.

By executing the same processing as the above-described one, the same condition as that shown in FIG. 2 is generated, and therefore, the same result as that of the equation (2) is obtained.

Returning again to the explanation with reference to FIG. 2, the CPU proceeds from the step S15 to a step S16, wherein it is judged whether or not the flag F1 is "1". In this case, if the flag F1 is not set to "1" in the step S4, i.e., the sign of the shift command is not reversed, the CPU proceeds from S16 to S21, and judges whether or not the flag F2 is "1".

If the flag F2 is not set to "1" (as will be described later, this flag F2 will not be set to "1" unless the shifting direction is reversed), it is further judged in a step S26 whether or not a counter D that counts a time period of backlash acceleration is equal to or less than "0".

If the counter D gives "0" (as will be described later, the counter D registers "0" when the backlash acceleration command is not outputted), both the feedforward processing and the backlash processing will be finished.

On the other hand, when the sign of the shift command Mcmd read in the step S1 as a shift command for the next distribution period is reversed against the sign of the shift command stored in the register Rz, and the flag F1 is set to "1" in the step S4, the CPU proceeds from the step S16 to step S17.

Then, it is judged in the step S17 whether the sign of the shift command stored in the register R1 is positive or negative to identify the direction in which the sign is changed, i.e., from positive to negative or from negative to positive.

If the value on the register R1 is negative, it is judged that the sign is changed from positive to negative, and the CPU proceeds to a step S18. Whereas, if the value on the register R1 is positive, the CPU proceeds to a step S19.

In the step S18, it is judged whether or not the feedforward amount FFO calculated in the step S14 is equal to or less than "0". If the feedforward amount FFO is larger than "0", the CPU proceeds to a step S21, and executes a previously described processing without initiating a backlash acceleration correction.

Furthermore, if the feedforward amount FFO is less than "0" in the step S19, the CPU proceeds to the step S21 in the same manner as the above-described case without initiating the backlash acceleration correction.

That is, as shown in FIG. 6, even if the sign of the next shift command read in this distribution period is reversed, the feedforward amount FFO will not immediately be reversed. Therefore, the backlash acceleration correction will not be initiated.

As obvious from the processing defined in the step S12, the reversed shift command will not affect the calculation of the feedforward amount FFO until the value of the counter C reaches a predetermined number of the position and speed loop processing period corresponding to a half of the distribution period, i.e., N/2, so that the sign of the feedforward amount FrO will not be reversed at least within a time period corresponding to N/2 times of position and speed loop processing period. For example, as shown in FIG. 6, even if the sign of the next shift command Mcmd is changed from positive to negative, the sign of the feedforward amount FFO will not be reversed during several periods of position and speed loop processing in the beginning of this distribution period.

However, when it is judged in the steps S18 and S19 that the feedforward amount FFO equals to "0" or its sign is reversed, the flag F2 is set to "1" in step S20. When the flag F2 has been set to "1", the CPU proceeds from the step S21 to the step S22, wherein the counter D is set to value A, which corresponds to a time period required for a backlash acceleration correction, and then, in step S23, the flag F2 is set to "0".

Subsequently, in the next step S24, a backlash acceleration correction amount having already been set will be outputted. This backlash acceleration correction amount is added to the speed command Vcmd, which has previously been corrected by the feedforward amount.

Next, the value registered on counter D is decremented by 1 in step S25 to finish both the feedforward control and the backlash acceleration correction control to be carried out in this period.

As the flags F1 and F2 are already set to "0" in the succeeding position and speed loop processing period, the CPU executes the processing defined by the steps S11 to S15, S16, and S21, and proceeds to the step S26. And, the CPU carries out the processings defined by the steps S24 and S25 so as to perform the backlash acceleration correction until the counter C is reduced to "0", i.e., until the predetermined backlash acceleration correction time has been elapsed. Then, after the value registered on the counter D becomes "0", the backlash acceleration correction will no longer be carried out.

By repeating the above-described processing, the initiating time of the backlash acceleration correction can be synchronized with the time when the sign of the feedforward amount FFO is reversed, so that the backlash acceleration correction can be carried out at the optimum position.

Furthermore, as is described in the foregoing, when the feedforward coefficient $\alpha$ is close to "1", the speed command Vcmd inputted in the speed loop processing becomes substantially the same as the command value determined by the feedforward control.

Thus, it is allowable to detect whether or not the sign of above-described speed command Vcmd is reversed, without detecting the sign of the feedforward amount FFO, and the time when the speed command Vcmd is reversed may be designated as an initiating time for the backlash acceleration correction. In this case, the judgements in the steps S18 and S19 are based on the comparison of the value of this speed command Vcmd and "0".

Figure 8:
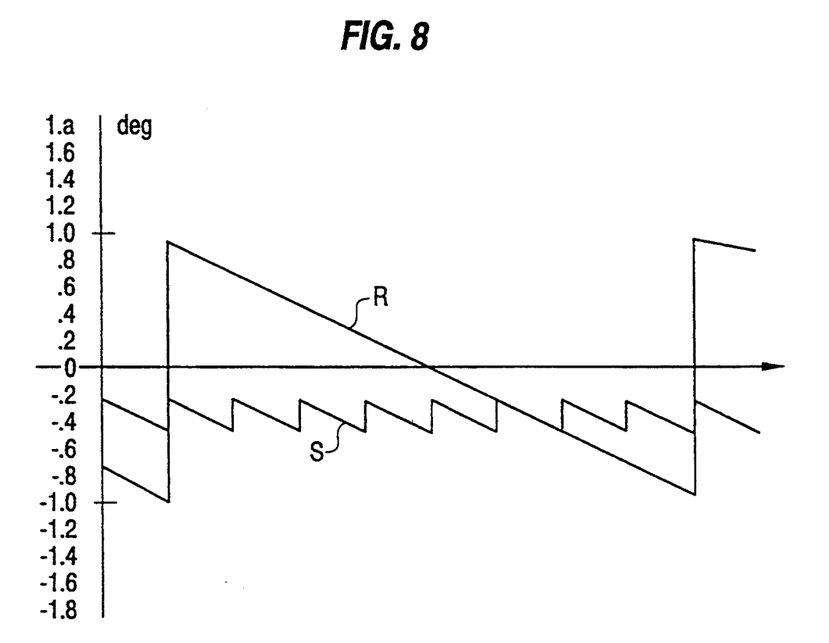

FIG. 8 is an explanatory view comparatively showing the shift command outputted from the CNC and the sign reversing time of the feedforward amount. In this example, a circle having a radius of 16 mm is cut at a speed of 4000 mm/min, with a distribution period of 8 msec and a position and speed loop processing period of 1 msec.

In this case, in response to a shift command given in each distribution period, a working point moves 0.53 mm that is equivalent to 1.9 degrees in terms of a central angle.

As a result, as shown by R in FIG. 8, a position where the shifting direction is reversed will be dispersed within a width of 1.9 degrees depending on an initiating point of the program prepared for cutting this circle.

Whereas, the feedforward amount has a smaller dispersion of approximately 0.2 degrees as shown by S in FIG. 8, so that the accuracy in determining an initiation point for the backlash acceleration can be improved.

According to the present invention, where a servomotor actuating a feed rod in the machine tool is controlled by the servo system capable of carrying out the feedforward control, an initiation time of the backlash acceleration correction is synchronized with a time when the sign of the feedforward amount is reversed, or a time when the sign of the speed command that has been modified by the feedforward amount is reversed, whereby the dispersion of turning point occurring in connection with the condition of the shift command, which has been distributed, can be absorbed, and the backlash acceleration correction can be executed from the position assuring a higher accuracy than by the conventional method.

What is claimed is:

1. A backlash acceleration control method for the feed rod of a machine tool driven by a servo motor, which is designed to be effective when a shifting direction of the feed rod is reversed, comprising steps of:
    obtaining a feedforward amount through a smoothing processing in which a shift command of a position and speed loop processing period and other shift commands respectively corresponding to several periods arrayed before and after this position and speed loop processing period are averaged;
    executing a feedforward control on the basis of said feedforward amount; and
    initiating a backlash acceleration correction at a time when said feedforward amount is reversed from positive to negative or vice versa.

2. A backlash acceleration control method in accordance with claim 1, in which said smoothing processing comprises of the step for obtaining an average of a number of shift commands of position and speed loop period, whose number corresponding to a distribution period, and said shift commands consisting of a shift command supplied for this position and speed loop processing and other shift commands evenly arrayed before and after said shift command for the position and speed loop processing; and
    said feedforward amount is obtained by multiplying the average of said several shift commands obtained through said smoothing processing by a feedforward coefficient.

3. A backlash acceleration control method in accordance with claim 1, wherein said feedforward amount is obtained using a shift command supplied for a present distribution period in which a present position and speed loop processing is carried out, a future shift command to be supplied for a next distribution period, and a shift command having been supplied for the last distribution period.

4. A backlash acceleration control method for the feed rod of a machine tool driven by a servo motor, which is designed to be effective when a shifting direction of the feed rod is reversed, comprising steps of:

obtaining a feedforward amount by smoothing shift commands supplied from a numerical control apparatus;

executing a feedforward control on the basis of said feedforward amount;

obtaining a speed command by adding said feedforward amount to a value obtained by multiplying a positional deviation by a position gain; and initiating a backlash acceleration correction at a time when said speed command is reversed from positive to negative or vice versa.

5. A backlash acceleration control method in accordance with claim 4, wherein the smoothing processing in said obtaining step is carried out by taking an average of a predetermined number of shift commands corresponding to a distribution period, and said shift commands consisting of a shift command supplied for position and speed loop processing and other shift commands evenly arrayed before and after said shift command for said position and speed loop processing; and said feedforward amount is obtained by multiplying the average of said several shift commands obtained through said smoothing processing by a feedforward coefficient.

6. A backlash acceleration control method in accordance with claim 4, wherein said feedforward amount is obtained using a shift command to be supplied for a present distribution period in which a present position and speed loop processing is carried out, a future shift command to be supplied for a next distribution period, and a shift command having been supplied for the last distribution period.

* * * * *

UNITED STATES PATENT AND TRADEMARK OFFICE
CERTIFICATE OF CORRECTION

PATENT NO. : 5,367,238
DATED : November 22, 1994
INVENTOR(S) : Keiji Sakamoto et al.

It is certified that error appears in the above-identified patent and that said Letters Patent is hereby corrected as shown below:

Title Page, [75] Inventors, line 2, "Oshino" should be ---Minamitsuru-gun--.

Col. 9, line 4, "FrO" should be --FFO--.

Signed and Sealed this

Twenty-eight Day of March, 1995

Attest:

BRUCE LEHMAN

*Attesting Officer*   *Commissioner of Patents and Trademarks*